(12) United States Patent
Nakazawa et al.

(10) Patent No.: US 7,108,647 B2
(45) Date of Patent: Sep. 19, 2006

(54) TOOL CHANGER OF MACHINE TOOL

(75) Inventors: Shunsuke Nakazawa, Yamatokoriyama (JP); Nobuhiro Kaneda, Yamatokoriyama (JP); Ryosuke Yasumura, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 11/014,217

(22) Filed: Dec. 17, 2004

(65) Prior Publication Data

US 2005/0143236 A1    Jun. 30, 2005

(30) Foreign Application Priority Data

Dec. 25, 2003   (JP)   .............................. 2003-428786

(51) Int. Cl.
    *B23Q 3/157*   (2006.01)
(52) U.S. Cl. .............................. 483/14; 483/3; 29/33 P; 409/134
(58) Field of Classification Search .................. 483/14, 483/3, 7, 8, 11, 26, 34, 60, 49, 50; 198/346.1, 198/346.2, 346.3; 414/744.1, 744.2, 744.3; 29/33 P; 409/134
    See application file for complete search history.

(56) References Cited

U.S. PATENT DOCUMENTS

| 3,825,245 | A | * | 7/1974 | Osburn et al. ............... 29/33 P |
| 4,090,287 | A | * | 5/1978 | Selander ........................ 483/1 |
| 4,494,282 | A | * | 1/1985 | Ida et al. ..................... 29/33 P |
| 4,498,571 | A | * | 2/1985 | Nomura et al. .......... 198/346.1 |
| 4,629,053 | A | * | 12/1986 | Dailey ..................... 198/346.1 |
| 4,673,076 | A | * | 6/1987 | Mattson ................... 198/346.2 |
| 4,717,306 | A | * | 1/1988 | Satake ..................... 414/222.08 |
| 4,735,548 | A | * | 4/1988 | Kimata et al. ........... 414/744.3 |
| 4,778,331 | A | * | 10/1988 | Kimata et al. ........... 414/744.1 |
| 4,797,052 | A | * | 1/1989 | Ohta et al. ................ 414/744.3 |
| 4,797,989 | A | * | 1/1989 | Cherko ........................ 483/14 |
| 4,915,569 | A | * | 4/1990 | Cherko ..................... 198/346.1 |
| 5,261,147 | A | * | 11/1993 | Wood, III ................... 29/33 P |
| 6,228,006 | B1 | * | 5/2001 | Horn et al. .................... 483/55 |
| 6,296,599 | B1 | * | 10/2001 | Staiger .......................... 483/3 |
| 6,308,815 | B1 | * | 10/2001 | Keith ...................... 198/346.1 |
| 6,325,748 | B1 | * | 12/2001 | Watanabe et al. .............. 483/1 |
| 6,679,369 | B1 | * | 1/2004 | Okuyama ................ 198/346.1 |
| 6,949,056 | B1 | * | 9/2005 | Soroka et al. ................ 483/14 |

FOREIGN PATENT DOCUMENTS

| JP | 2532663 Y | 1/1997 |
| JP | 11-58161 A | 3/1999 |

* cited by examiner

*Primary Examiner*—Monica Carter
*Assistant Examiner*—Dana Ross
(74) *Attorney, Agent, or Firm*—Smith Patent Office (57) ABSTRACT

The present invention provides a tool changer of a machine tool capable of suppressing cost increase and preventing size increase of the machine when a tool magazine is mounted. In a tool changer of a machine tool provided with a pallet change mechanism 10 in which a machining-side pallet 11 disposed on a machining area A side and a standby-side pallet 12 disposed on a standby area B side are turned around a turn shaft 14 by a turning member 13 to be automatically changed, a tool magazine 28 holding a plurality of tools T1 to T4 is disposed between the machining-side pallet 11 and the standby-side pallet 12 in the turning member 13 and the tool magazine 28 is turned by the turning member 13 so that the tools T1 to T4 face a spindle 5 disposed on the machining area A side.

12 Claims, 11 Drawing Sheets

TOOL CHANGER OF MACHINE TOOL

BACKGROUND OF THE INVENTION

1. Field of the Invention

The present invention relates to a tool changer of a machine tool provided with a pallet change mechanism in which a machining-side pallet and a standby-side pallet are turned by a turning member around a turn shaft to be automatically changed.

2. Description of the Related Art

For example, a horizontal machining center sometimes uses, for machining a workpiece, a long tool that is longer than a standard size tool. As an example of a tool changer capable of automatically changing such long tools, there is a tool changer structured such that a support table on which a plurality of long tools are arranged is moved by an actuator between a standby position and a tool change position on a bed, thereby allowing a spindle to grip a required tool (for example, Japanese Utility Model Registration No. 2532663). As another example, there is a tool changer structured such that a gate-shaped frame is installed on a bed and a tool holder holding a long tool is disposed on a cross beam of the frame to be movable by an actuator between the outside and the inside of a machining area, thereby allowing a spindle to grip a required tool (for example, Japanese Patent Application Laid-open No. Hei 11-58161).

SUMMARY OF THE INVENTION

Both of the above-described conventional tool changers, however, require a specialized actuator for moving the support table and the tool holder, and further require separately secured space for placing the large support table and gate-shaped frame on the bed. This poses a problem of cost increase and size increase of the entire machine.

The present invention was devised in view of the above-described conventional situation and it is an object of the present invention to provide a tool changer of a machine tool capable of suppressing cost increase and preventing size increase of the machine in mounting a tool magazine.

The present invention is a tool changer of a machine tool provided with a pallet change mechanism in which a machining-side pallet disposed on a machining area side and a standby-side pallet disposed on a standby area side are turned around a turn shaft by a turning member to be automatically changed, the tool changer comprising: a tool magazine holding at least one tool and disposed in a pallet turning area of the turning member, wherein the tool magazine is turnable by the turning member to bring the tool to a position facing a spindle disposed in the machining area side.

In the tool changer of the present invention, the tool magazine is disposed in the pallet turning area of the turning member and is movable by the turning member so as to face a spindle disposed on the machining area side. Therefore, a dead space between the machining side and the standby side can be effectively utilized for placing the tool magazine, which can prevent size increase of the machine. Further, the existing turning member for driving the turn of the machining-side and standby-side pallets can be effectively used for moving the tool magazine to the machining area side. This can eliminate a need for a specialized actuator for the tool magazine to realize cost reduction.

According to one preferred embodiment of the present invention, the tool magazine turned to the machining area side is supported by a machining table, which is disposed on the machining area side, for supporting the machining-side pallet, and the machining table and the spindle are relatively moved in X-axis, Y-axis, and Z-axis directions to allow the spindle to grip the tool held by the tool magazine.

In the above-described embodiment, the tool magazine is supported by the existing machining table for supporting the machining-side pallet. Therefore, the number of parts need not be increased for supporting the tool magazine, which allows cost reduction.

According to another preferred embodiment of the present invention, the tool magazine turned to the machining area side is fixedly positioned by a clamp mechanism, which is disposed on the machining table, for fixedly positioning the machining-side pallet.

In the above-described embodiment, the tool magazine is fixedly positioned by the clamp mechanism, which is provided on the machining table, for positioning the machining-side pallet. Therefore, it is possible to use the existing clamp mechanism as it is for positioning the tool magazine, which allows cost reduction.

In still another preferred embodiment of the present invention, the tool magazine is disposed between a pair of partition plates that are provided between the machining-side pallet and the standby-side pallet in the turning member, being spaced from each other, to separate the machining area side and the standby area side from each other.

In the above-described embodiment, the tool magazine is housed between the pair of partition plates separating the machining area side and the standby area side from each other. Therefore, it is possible to prevent chips and coolant from scattering to the tool magazine during machining.

In yet another preferred embodiment of the present invention, the tool magazine is disposed in an outer end portion in a radial direction of the turning member and the tool is held by the tool magazine to be directed to an inner side in the radial direction.

In the above-described embodiment, the tool magazine is disposed in the outer end portion in the radial direction of the turning member and the tool is arranged to be directed to the inner side in the radial direction. This makes it possible to efficiently house a long tool that is longer than a standard-size tool.

In yet another preferred embodiment of the present invention, the tool magazine is disposed in an outer end portion in a radial direction of the turning member and the tool is held by the tool magazine to be directed in a direction crossing the radial direction.

In the above-described embodiment, the tool is held to be directed in the direction crossing the radial direction. Therefore, a vacant space can be utilized to efficiently house a long tool.

DETAILED DESCRIPTION OF THE PREFERRED EMBODIMENT

Hereinafter, an embodiment of the present invention will be described based on the attached drawings.

Figure 1:
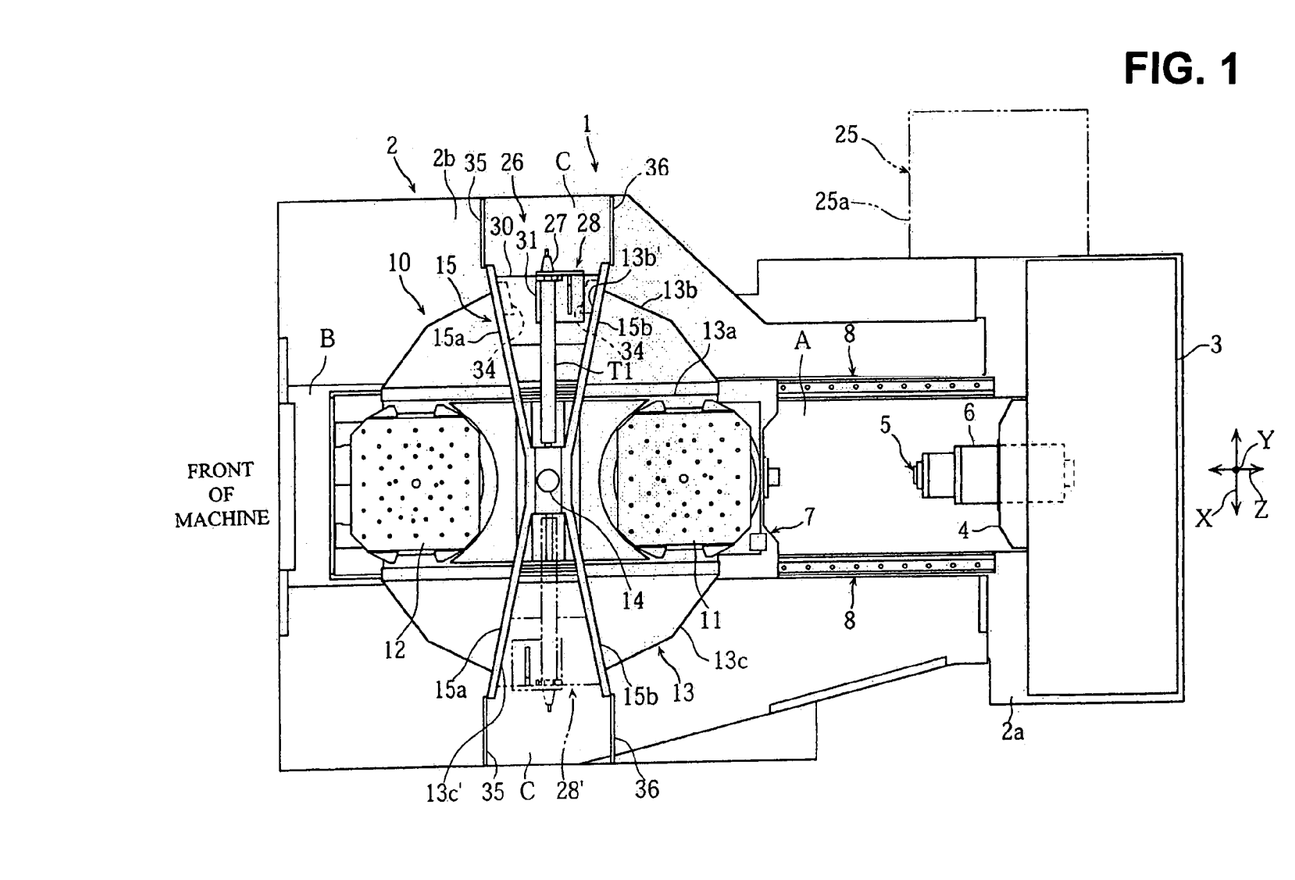
FIG. 1 is a plan view to explain a tool changer of a horizontal machining center according to an embodiment of the present invention.
Figure 7:
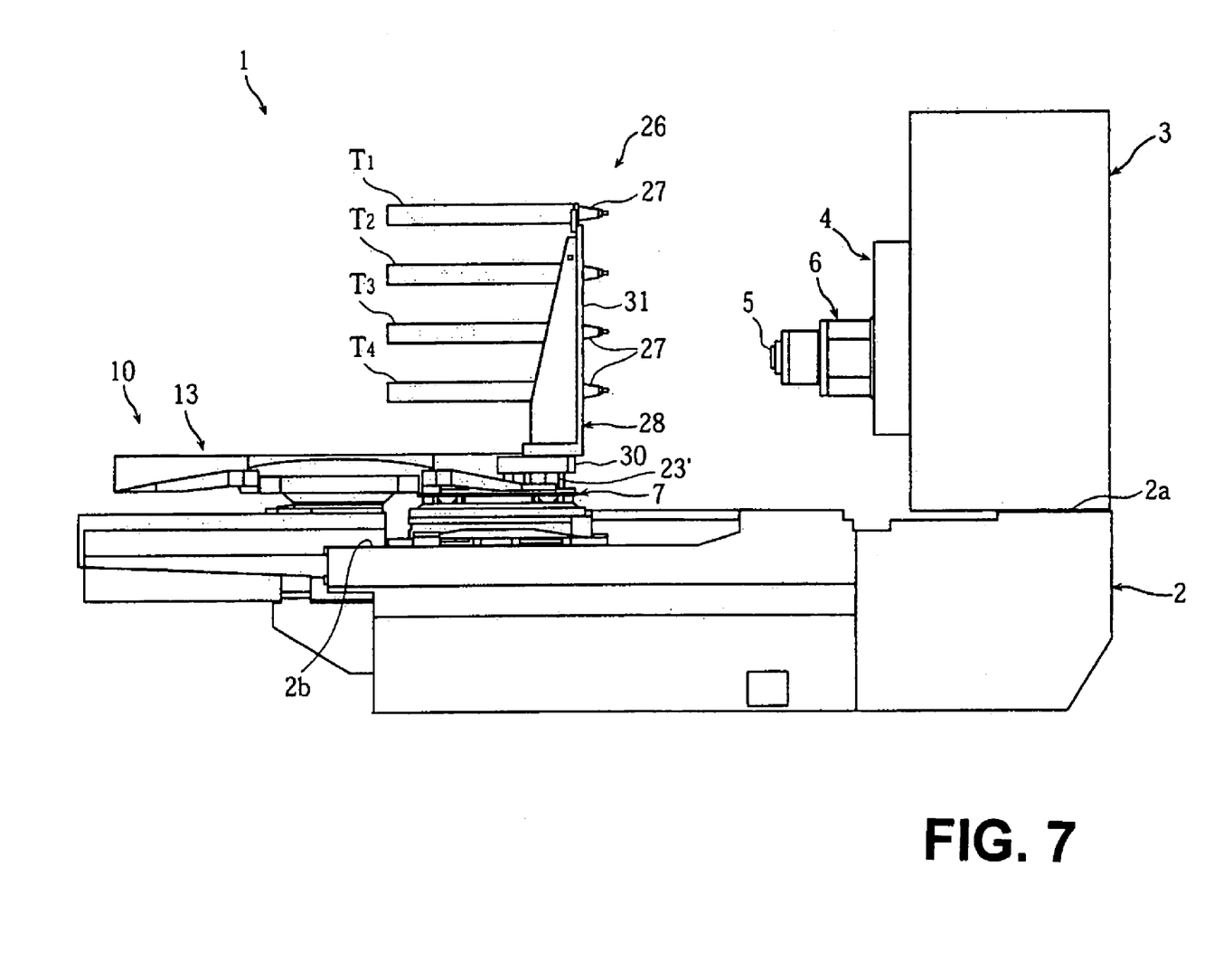
FIG. 7 is a side view of the horizontal machining center.
Figure 8:
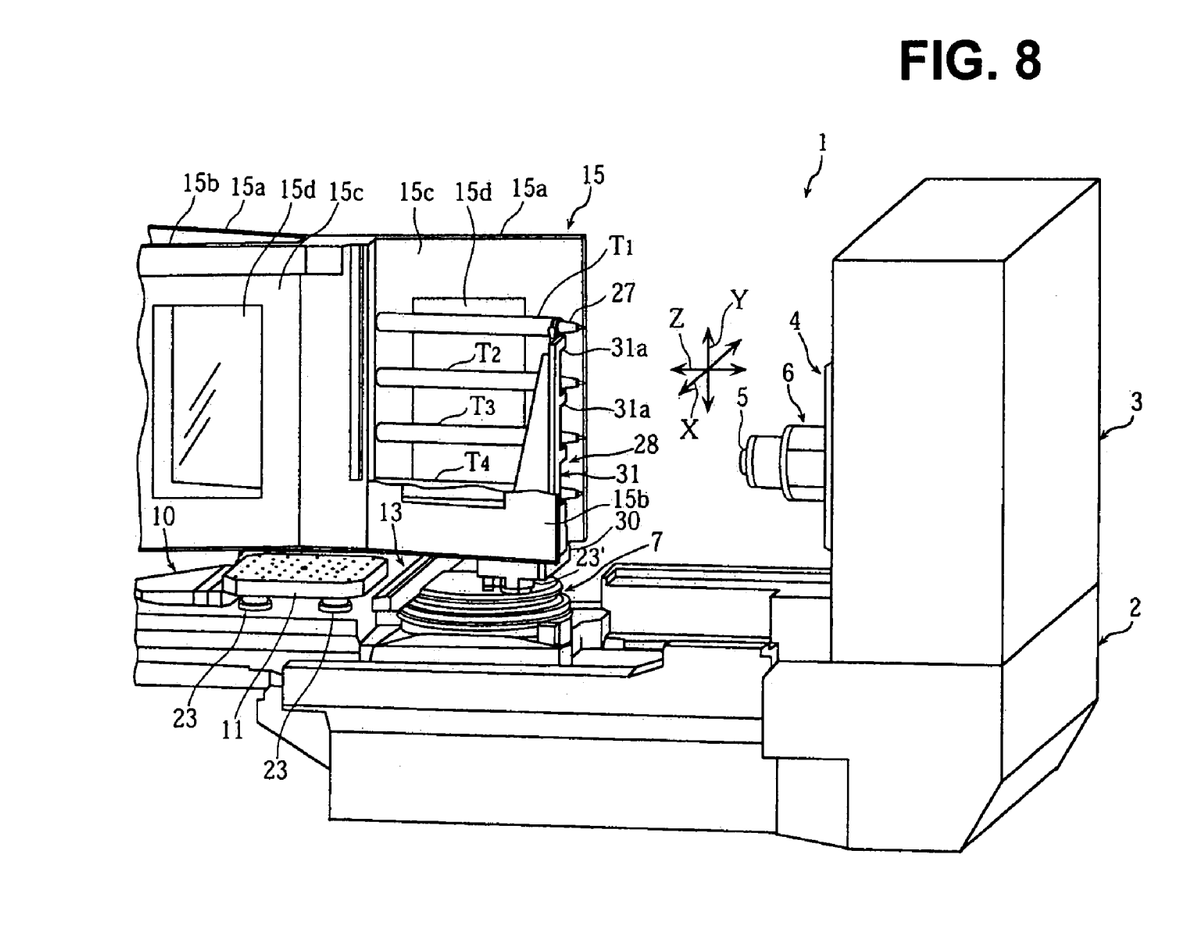
FIG. 8 is a perspective view of the horizontal machining center.
Figure 9A:
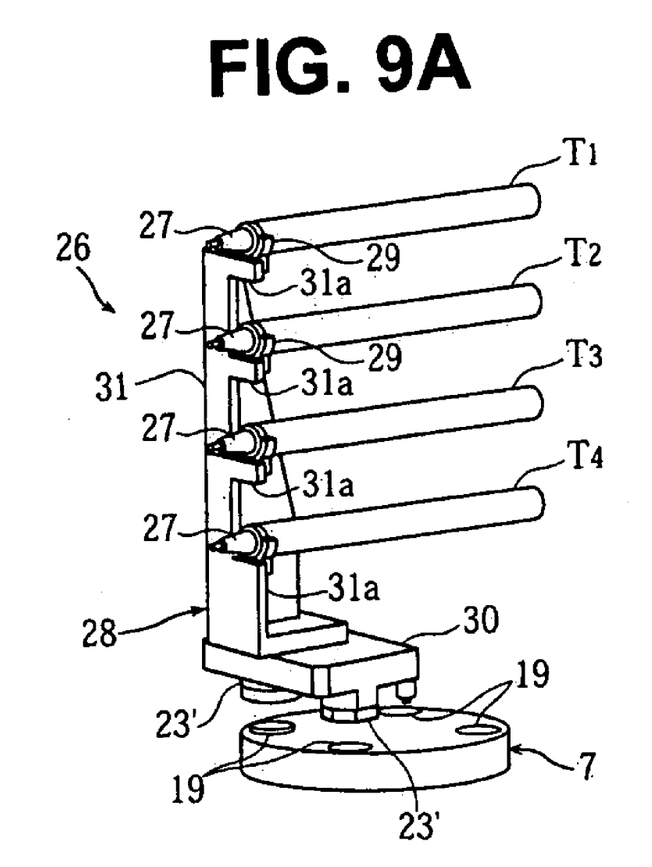
FIG. 9(a) and FIG. 9(b) are views of a tool magazine of the tool changer.
Figure 9B:
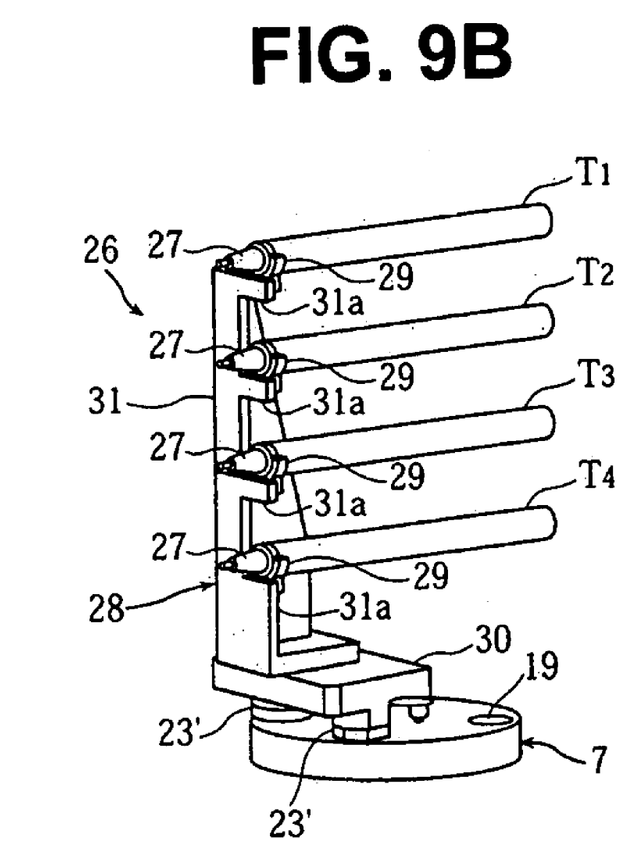
Figure 10:
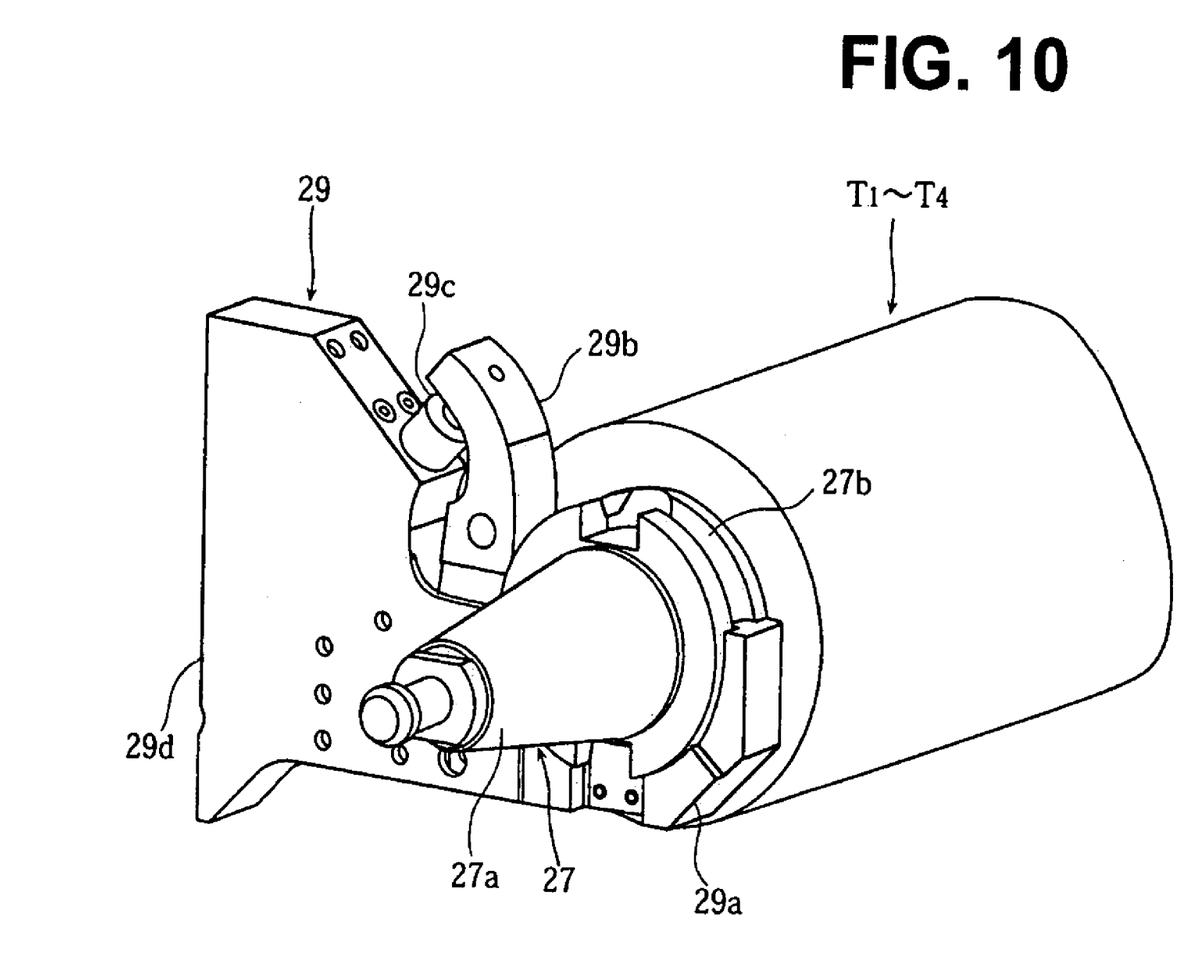
FIG. 10 is a perspective view of a tool holding mechanism and a tool holder of the tool magazine.
Figure 11:
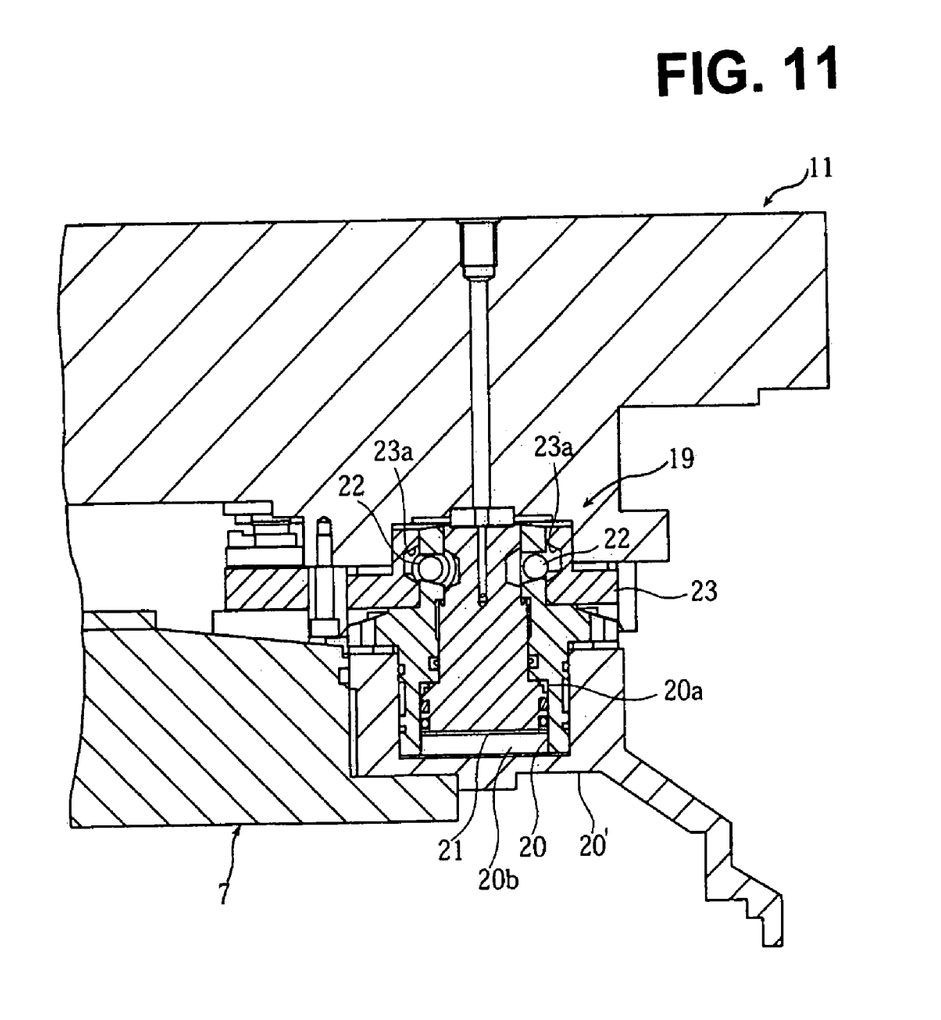
FIG. 11 is a cross-sectional view of a clamp mechanism of a pallet changer of the horizontal machining center.

FIG. 1 to FIG. 11 are views to explain a tool changer of a horizontal machining center (machine tool) according to an embodiment of the present invention. FIG. 1 is a plan view of the horizontal machining center, FIG. 2 to FIG. 6 are plan views showing tool changing operations of the tool changer, FIG. 7 and FIG. 8 are a side view and a perspective view of the horizontal machining center, FIG. 9(a) and FIG. 9(b) are perspective views of the tool magazine, FIG. 10 is a perspective view of a tool holding mechanism and a tool holder, and FIG. 11 is a cross-sectional view of a clamp mechanism of a pallet changer.

In the drawings, 1 denotes the horizontal machining center. The horizontal machining center 1, when seen from a front side of the machine, is structured such that a substantially rectangular parallelepiped column 3 is fixedly disposed on a back end portion 2a of a fixed bed 2, a saddle 4 is disposed on a front face of the column 3 to be movable in an X-axis (right and left direction), a spindle head 6 to which a spindle 5 is attached is disposed on the saddle 4 to be movable in a Y-axis (up and down) direction, and a machining table 7 is disposed in front of the column 3 on the fixed bed 2 to be movable in a Z-axis (back and forth) direction.

The saddle 4 and the spindle head 6 are movably supported by a not-shown guide rail and are driven by not-shown ball screw and servo motor to make reciprocating movement. The spindle 5 is rotatably supported by the spindle head 6 and is driven to rotate by a not-shown drive motor. The machining table 7 is movably supported by a pair of left and right guide rails 8, 8 disposed on the fixed bed 2 and are driven to make reciprocating movement by not-shown ball screw and servo motor.

A pallet changer 10 is disposed on a front portion 2b of the fixed bed 2. The pallet changer 10 automatically changes a machining-side pallet 11 supported by the machining table 7 and a standby-side pallet 12 disposed on a machine front side of the fixed bed 2 in such a manner that the machining-side pallet 11 and the standby-side pallet 12 are moved up and down by a turning member 13 driven by a not-shown vertical drive mechanism and are 180 degrees turned around a turn shaft 14 by a turn drive mechanism. In the above-described manner, a machined workpiece set in the machining-side pallet 11 is replaced with a subsequently machined workpiece set in the standby-side pallet 12.

A partition member 15 is disposed between the machining-side and standby-side pallets 11, 12 in the turning member 13. The partition member 15 separates a space above the front portion 2b of the fixed bed 2 into a machining area A side and a standby area B side, thereby preventing chips and coolant from scattering to the standby area B side during machining. The partition member 15 is fixed so as to turn with the turning member 13.

The turning member 13 is composed of a turn arm 13a formed in a substantially H shape in a plan view to be engageable with bottom faces of the machining-side and standby-side pallets 11, 12 and substantially semicircular turn tables 13b, 13c fixed to outer sides of the turn arm 13a. The turn shaft 14 is fixed at the center of the turn of the turn arm 13a.

Figure 3:
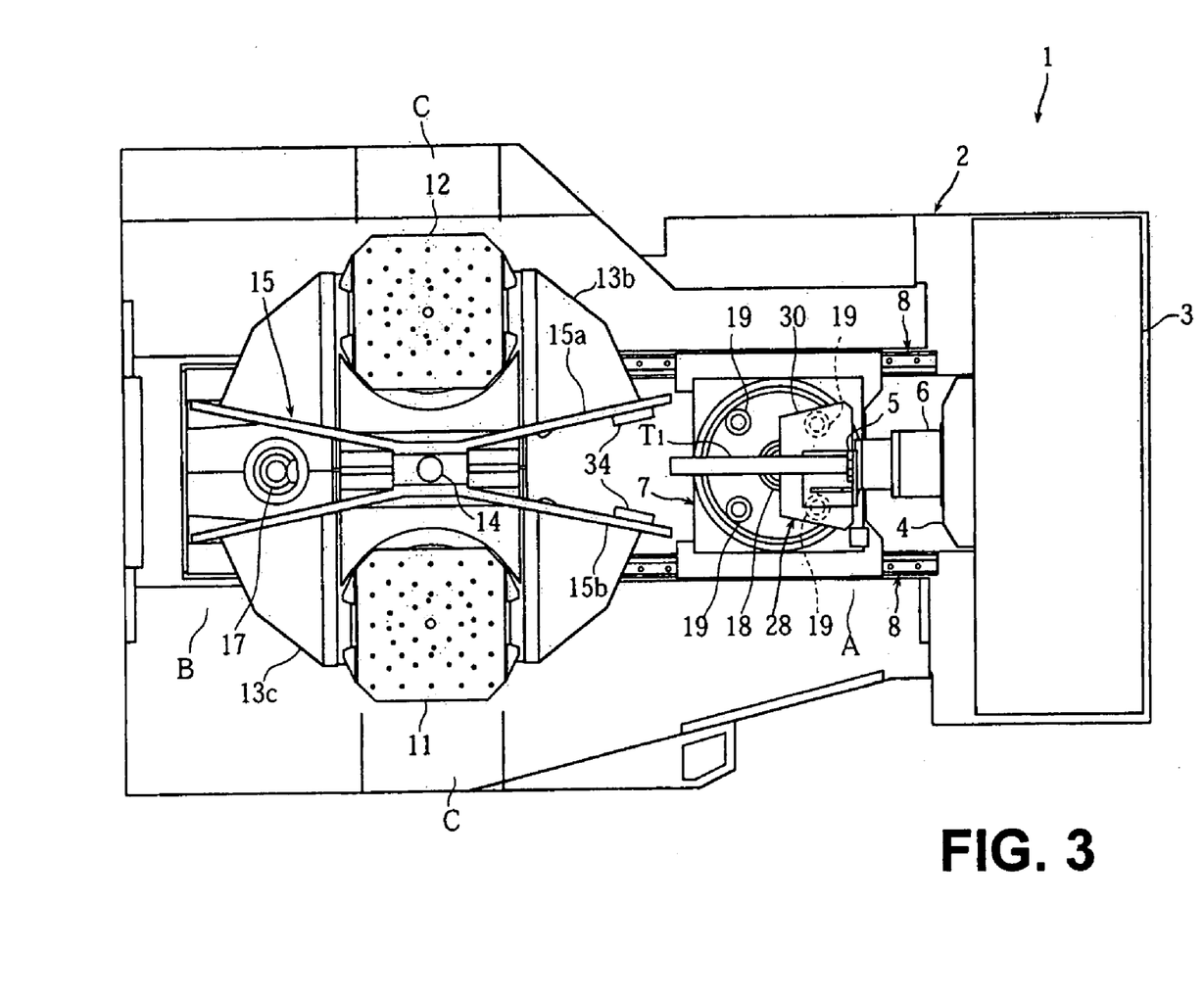
FIG. 3 is a plan view showing a tool changing operation of the tool changer.

Further, a rotary indexing mechanism 18 that rotary-indexes the machining-side pallet 11 at a predetermined rotation angle position and four clamp mechanisms 19 fixedly positioning the machining-side pallet 11 are provided on the machining table 7 (see FIG. 3). The clamp mechanisms 19 are arranged on an outer periphery of the rotary indexing mechanism 18 at 90 degree intervals. On the standby area B side, a rotary indexing mechanism 17 that rotary-indexes the standby-side pallet 12 at a predetermined rotation angle position is further disposed.

As shown in FIG. 11, each of the clamp mechanisms 19 is roughly structured such that a cylinder member 20 is disposed on a base member 20' fixed to the machining table 7, a piston 21 is inserted in the cylinder member 20 to be movable up and down between a clamp position (down) and an unclamp position (up), and a plurality of lock balls 22 are disposed in the cylinder member 20 to be movable back and forth in the radial direction. Further, ring-shaped positioning members 23 are fixed to portions of a bottom face of the machining-side pallet 11 corresponding to the respective clamp mechanisms 19, and depressions 23a to which the lock balls 22 are fitted are recessedly formed on an inner circumferential surface of the positioning member 23. Note that FIG. 11 shows an unclamped state.

When the machining-side pallet 11 is turned to be positioned above the machining table 7 and then moves down, the cylinder member 20 is fitted to the positioning member 23, a hydraulic pressure is then supplied to a downward hydraulic pressure chamber 20a of the cylinder member 20, so that the piston 21 moves down and the lock balls 22 are fitted to the depressions 23a. Consequently, the machining-side pallet 11 is fixedly positioned on the machining table 7. When the hydraulic pressure of the downward hydraulic pressure chamber 20a is released and oil is supplied to an upward hydraulic pressure chamber 20b, the piston 21 moves up and the lock balls 22 are detached from the depressions 23a.

The horizontal machining center 1 of this embodiment includes a first and a second tool changer 25, 26. As shown in FIG. 1, the first tool changer 25 is mostly disposed on a side face of the column 3 of the fixed bed 2, and it includes: a tool magazine 25a that holds a plurality of standard-size tools (not shown) which are set in parallel with an axis of the spindle 5; and a tool changing arm (not-shown) disposed between the tool magazine 25a and the spindle 5. The tool changing arm automatically changes a preceding process tool attached to the spindle 5 to a subsequent process tool held by the tool magazine 25a.

The second tool changer 26 includes: a tool magazine 28 in which a plurality of long tools T1 to T4 each constituted of a boring bar or the like are disposed with an axis thereof being set horizontal; and tool holding mechanisms 29 holding the respective long tools T1 to T4 on the tool magazine.

Each of the long tools T1 to T4 has a larger tool diameter and a larger tool length than a standard-size tool and is, for example, about 200 φ in maximum tool diameter and about 1000 mm in maximum tool length. Further, each of the long tools T1 to T4 has a cutting tool fixedly attached to the tool holder 27. The tool holder 27 has a tapered portion 27a that is to be fittedly inserted to the spindle 5 and a fitting groove 27b in a ring shape held by the tool holding mechanism 29 (see FIG. 10).

The tool magazine 28 is structured such that a tool holding member 31 is fixedly disposed on a support base 30 and four shelf portions 31a are vertically arranged at intervals in the tool holding member 31. The long tools T1 to T4 are held on the respective shelf portions 31a by the tool holding mechanisms 29. A pair of positioning members 23' similar to the aforesaid positioning members 23 are fixedly disposed on a bottom surface of the support base 30. The tool magazine 28 is fixedly positioned by the two clamp mechanisms 19 of the machining table 7 via the respective positioning members 23'.

As shown in FIG. 10, the tool holding mechanism 29 is structured such that a main body portion 29d fixed to the shelf portion 31a has a holding portion 29a fitted to a lower hem of the fitting groove 27b of the tool holder 27 and swingably supports a tool retainer 29b fitted to an upper hem of the fitting groove 27b, and the tool retainer 29b is driven by a hydraulic cylinder portion 29c to move back and forth.

The partition member 15 includes a pair of partition plates 15a, 15b whose portions closer to the outer side of the machine open wider in the right and left direction from the turn shaft 14. The respective partition plates 15a, 15b are fixed to the left and right turn tables 13b, 13c. Each of the partition plates 15a, 15b is structured such that a window plate 15d made of transparent resin is disposed in a frame member 15c in a rectangular frame shape as shown in FIG. 8. This window plate 15d allows the inside of the machine to be seen therethrough. Further, the left and right turn tables 13b, 13c have cutout openings 13b', 13c' formed between the partition plates 15a, 15b.

The tool magazine 28, when seen from the front side of the machine, is disposed on the left turn table 13b, being arranged between the partition plates 15a, 15b positioned between the machining-side pallet 11 and the standby-side pallet 12. The tool magazine 28 is disposed in an outer end portion in the radial direction of the turn table 13b, and the long tools T1 to T4 are arranged to be directed to the inner side in the radial direction from the outer end portion of the turn table 13b.

Support members 34, 34 supporting the tool magazine 28 are fixed to lower edges of the respective partition plates 15a, 15b. The support members 34, 34 are fitted to the bottom surface of the support base 30 to support the tool magazine 28. Further, partition members 35, 36 made of elastic materials or the like are disposed between the respective left and right partition plates 15a, 15b and an outer edge of the fixed bed 2 to be in contact with the partition members 15a, 15b respectively. By the partition members 35, 36, a tool housing chamber C separated from the machining area A side and the standby area B side is formed between the partition plates 15a, 15b, which enables replacement and maintenance of the long tools T1 to T4 from the outside of the machine.

In the horizontal machining center 1 of this embodiment, a workpiece (not shown) is machined in such a manner that a tool (not shown) attached to the spindle 5 is rotated while the machining table 7 having the workpiece placed thereon, the saddle 4, and the spindle head 6 are relatively moved in the Z-axis direction, the X-axis direction, and the Y-axis direction respectively.

Figure 2:
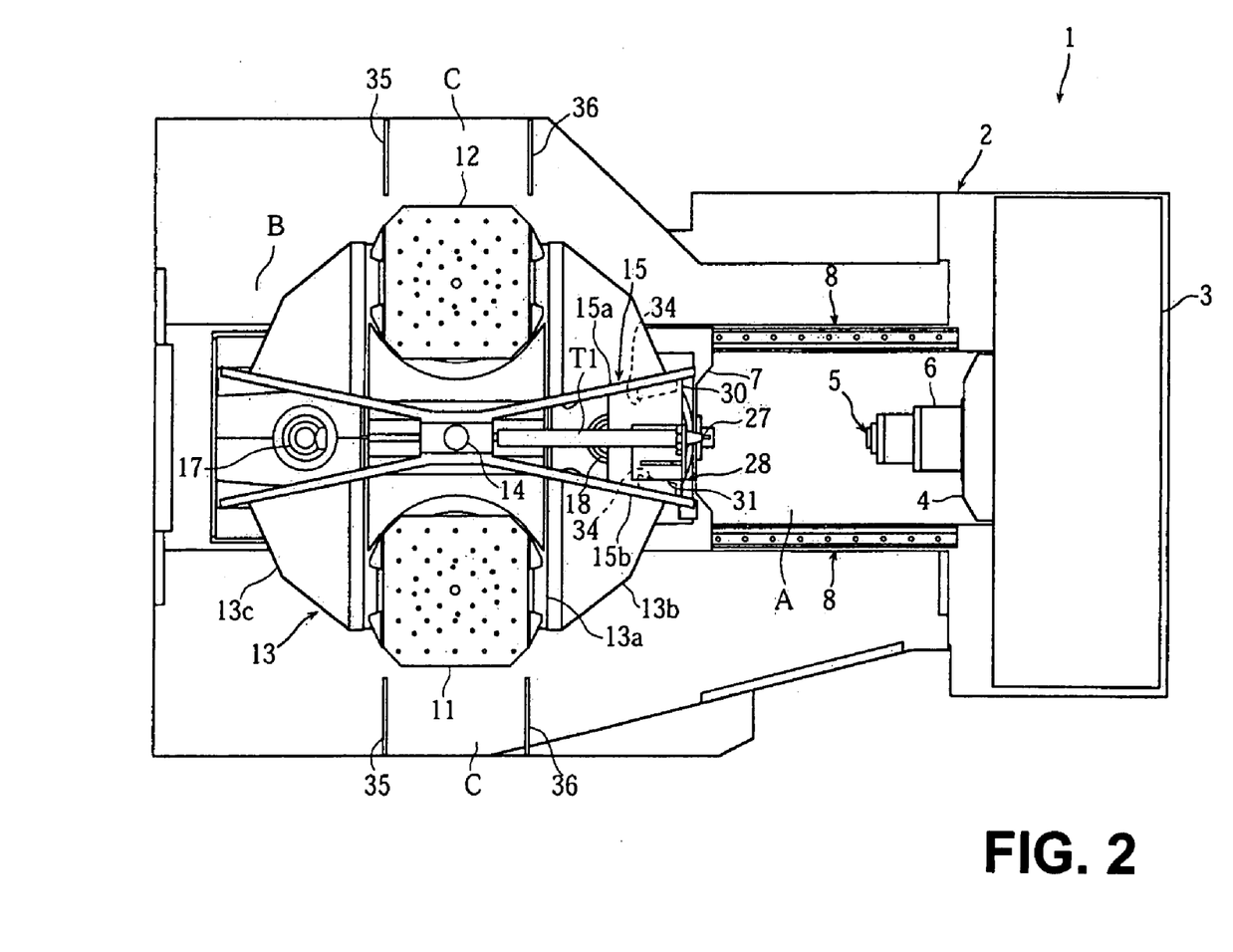
FIG. 2 is a plan view showing a tool changing operation of the tool changer.

For tool change by the second tool changer 26, the turning member 13 moves up the machining-side and standby-side pallets 11, 12 and the tool magazine 28, and in this state, the turning member 13 turns 90 degrees clockwise (see FIG. 2). This causes the tool magazine 28 to move to the machining area A side, so that the tool holders 27 of the respective long tools T1 to T4 face the spindle 5. Subsequently, the turning member 13 moves down the tool magazine 28 and the respective positioning members 23' are fixed by the clamp mechanisms 19 of the machining table 7, so that the tool magazine 28 is fixedly positioned on the machining table 7.

The machining table 7 moves in the Z-axis direction toward the spindle 5 side and the spindle 5 moves in the X-axis and Y-axis directions to grip the long tool T1 (see FIG. 3). In this case, if a preceding process long tool is attached to the spindle 5, the preceding process long tool is first returned to the tool magazine 28 and thereafter, a subsequent process long tool is gripped.

Figure 4:
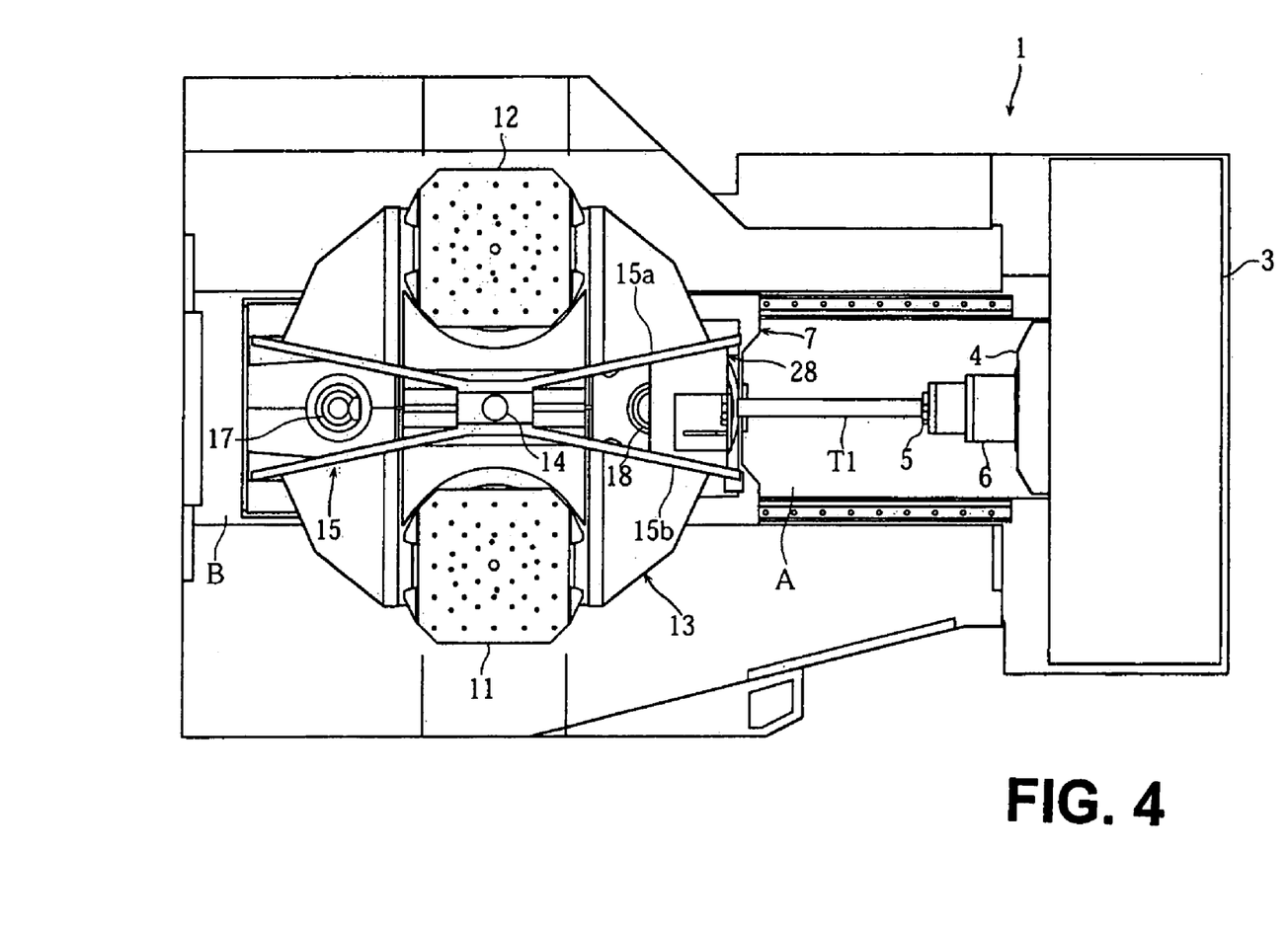
FIG. 4 is a plan view showing a tool changing operation of the tool changer.
Figure 5:
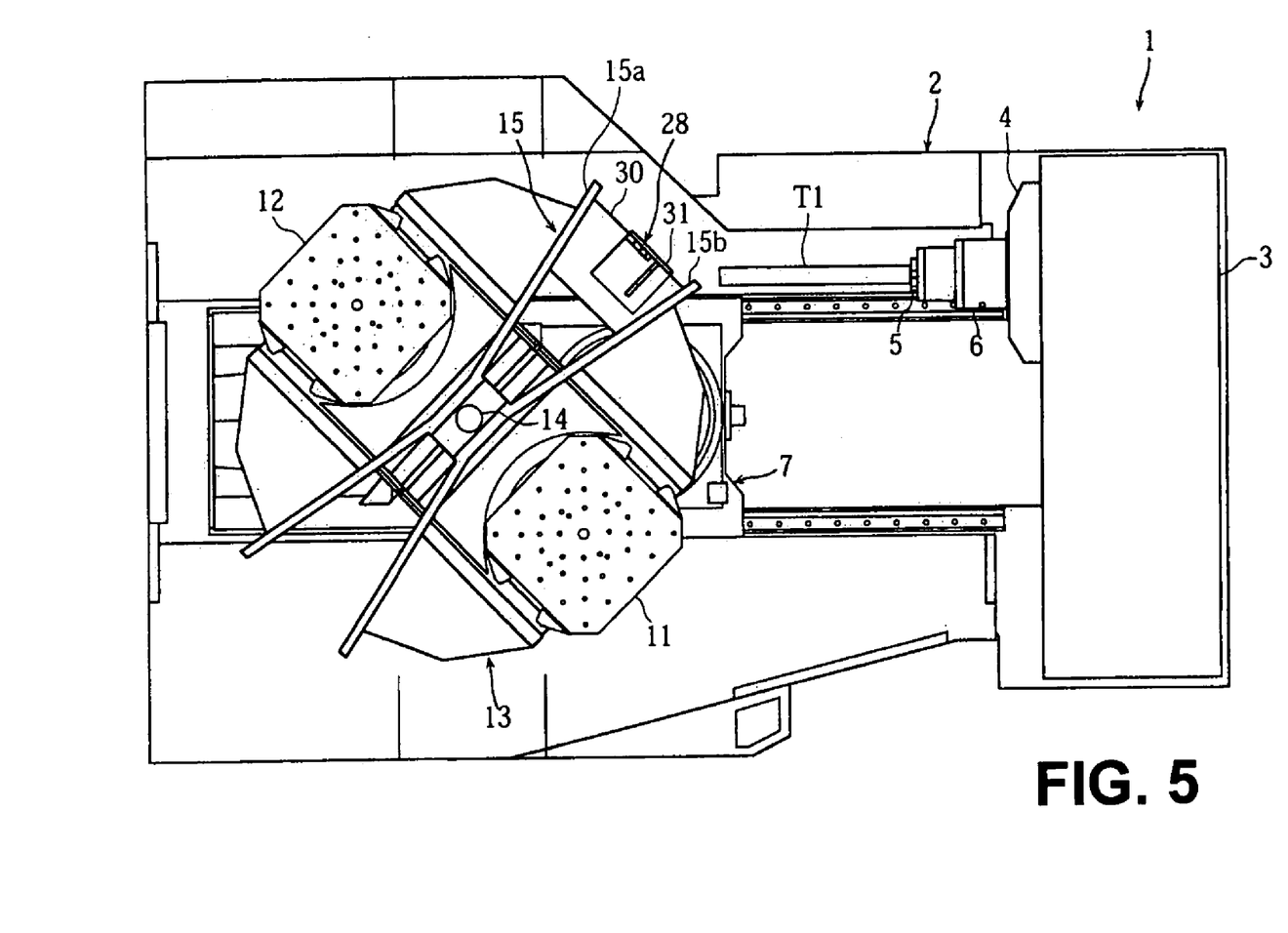
FIG. 5 is a plan view showing a tool changing operation of the tool changer.
Figure 6:
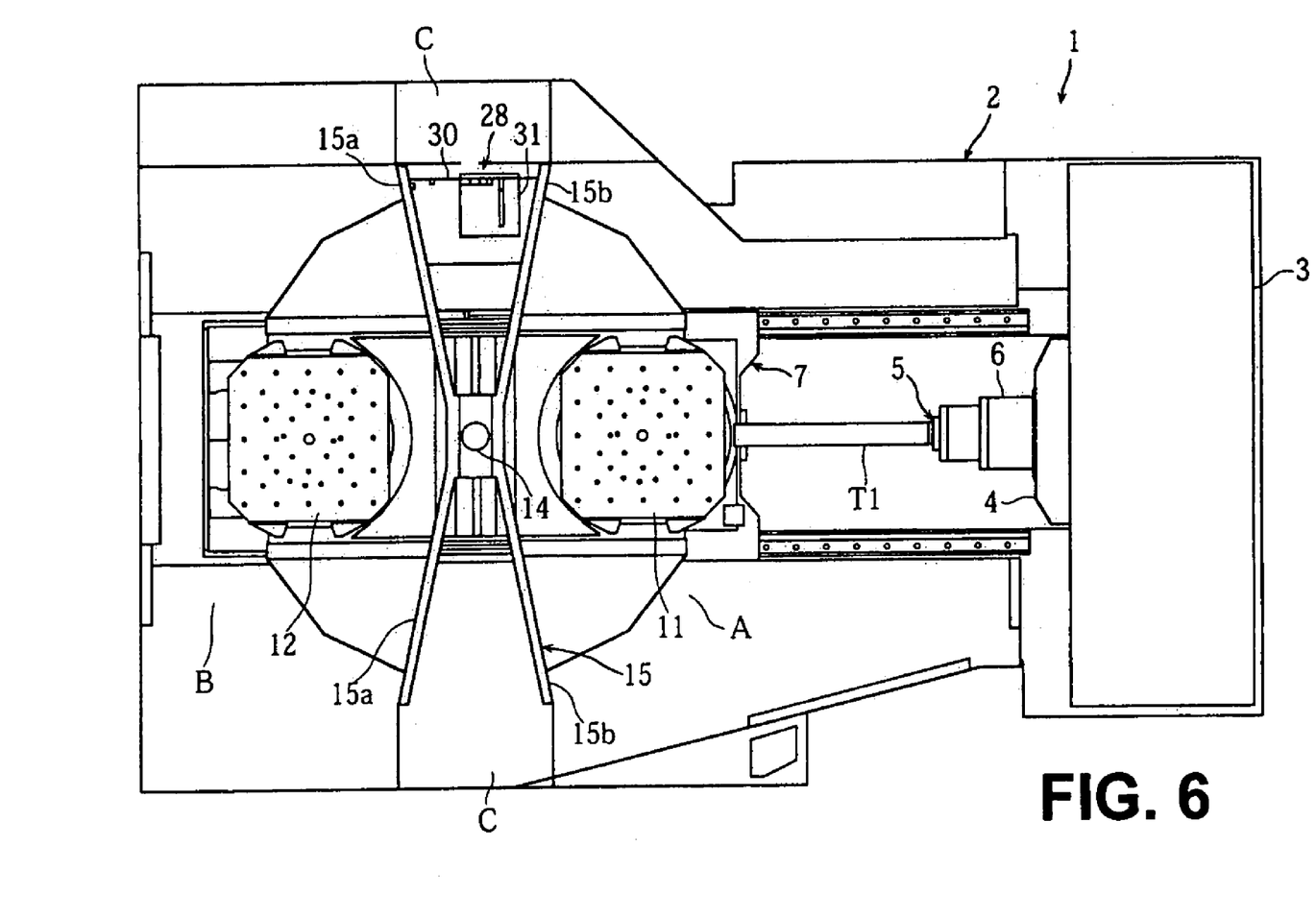
FIG. 6 is a plan view showing a tool changing operation of the tool changer.

When the machining table 7 moves in the Z-axis direction to move back to a pallet change position, the tool magazine 28 is unclamped and the turning member 13 moves up to support the tool magazine 28 (see FIG. 4). Next, the turning member 13 turns 90 degrees anticlockwise. If this turn causes interference between the long tool T1 attached to the spindle 5 and the partition plates 15a, 15b, the saddle 4 is first moved in the X-axis direction to set aside the long tool T1 as shown in FIG. 5.

The turn of the turning member 13 causes the tool magazine 28 to be housed in the tool housing chamber C, and the machining-side pallet 11 is clamped to the machining table 7 on the machining area A side. In this state, the workpiece is machined with the long tool T1 (see FIG. 6).

As described above, according to this embodiment, the tool magazine 28 is disposed in the turning member 13, being arranged between the machining-side pallet 11 and the standby-side pallet 12, and the tool magazine 28 is turned by the turning member 13 so as to face the spindle 5 on the machining area A side. Therefore, a dead space between the machining-side and standby-side pallets 11, 12 can be effectively utilized for placing the tool magazine 28, so that size increase of the machine can be prevented.

Further, the turning member 13 of the pallet changer 10 for driving the turn of the machining-side and standby-side pallets 11, 12 can be utilized for moving the tool magazine 28 to the machining area A side. This can eliminate a need for an actuator specialized for the tool magazine to realize cost reduction.

In this embodiment, the tool magazine 28 is supported by the existing machining table 7 for supporting the machining-side pallet 11. Therefore, the number of parts need not be increased for supporting the tool magazine 28, which can realize cost reduction.

The tool magazine 28 is fixedly positioned by the clamp mechanisms 19, which are provided on the machining table 7, for positioning the machining-side pallet 11. This allows the existing clamp mechanisms 19 to be used for positioning of the tool magazine 28. Cost reduction can be also realized in this respect.

In this embodiment, the tool magazine 28 is housed between the pair of partition plates 15a, 15b separating the machining area A side and the standby area B side from each other. This can prevent chips and coolant from scattering to the tool magazine 28 during machining. In this case, only specification change of the partition member 15 is necessary, so that cost increase of the entire tool changer 26 can be suppressed and the partition member 15 after specification change can be mounted later to replace an originally mounted partition member.

Further, the tool magazine 28 is disposed in the outer end portion in the radial direction of the turning member 13 and the long tools T1 to T4 are arranged to be directed to the inner side in the radial direction. This structure enables efficient housing of the long tools T1 to T4 having a large length.

Incidentally, in this embodiment, the tool magazine 28 is disposed on the left turn table 13b when seen from the front side of the machine, but in the present invention, a tool magazine 28' may be also disposed on the right turn table 13c side as shown by a chain double-dashed line in FIG. 1. In such a structure, the number of tools housable can be doubled.

Further, in the above-described embodiment, the description is given on the example in which the tool magazine is mounted on the pallet changer having two pallets, but the present invention is also applicable to a pallet changer having three pallets. In this case, by disposing the tool magazine between the pallets, substantially the same effects as those of the above-described embodiment are also obtainable.

Further, in the above-described embodiment, an example where the machining table moves in the Z-axis direction is described, but the present invention is also applicable to a case where the column moves in the Z-axis direction.

In the above-described embodiment, the tools T1 to T4 are disposed to be directed to the inner side in the radial direction of the turning member 13, but in the present invention, the tools may be disposed to be directed in a direction perpendicular to the radial direction. The inventions of claim 7 and claim 8 correspond to this structure. In this case, after the tool magazine is clamped to the machining table, the tools are turned 90 degrees by the machining table so that the tools face the spindle.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A tool changer of a machine tool provided with a pallet change mechanism in which a machining-side pallet disposed on a machining area side and a standby-side pallet disposed on a standby area side are turned around a turn shaft by a turning member, said tool changer comprising a tool magazine holding at least one tool, a portion of said tool magazine being disposed on the turning member, wherein said tool magazine is turnable by the turning member to bring the tool to a position facing a spindle disposed in the machining area side, and a pair of partition plates extending between the machining-side pallet and the standby-side pallet, at least one end of each of the partition plates being spaced from each other, wherein said tool magazine is disposed between the partition plates and said partition plates separate the machining area side and the standby area side from each other.

2. The tool changer of the machine tool according to claim 1, wherein said tool magazine turned to the machining area side is supported by a machining table, which is disposed on the machining area side, for supporting the machining-side pallet, and the machining table and the spindle are relatively moved in X-axis, Y-axis, and Z-axis directions to allow the spindle to grip the tool held by the tool magazine.

3. The tool changer of the machine tool according to claim 2, wherein said tool magazine turned to the machining area side is fixedly positioned by a clamp mechanism, said clamp mechanism being disposed on the machining table for fixedly positioning the machining-side pallet.

4. The tool changer of the machine tool according to claim 3, wherein said tool magazine is disposed in an outer end portion in a radial direction of the turning member and the tool is held by said tool magazine to be directed to an inner side in the radial direction.

5. The tool changer of the machine tool according to claim 3, wherein said tool magazine is disposed in an outer end portion in a radial direction of the turning member and the tool is held by said tool magazine to be directed in a direction crossing the radial direction.

6. The tool changer of the machine tool according to claim 2, wherein said tool magazine is disposed in an outer end portion in a radial direction of the turning member and the tool is held by said tool magazine to be directed to an inner side in the radial direction.

7. The tool changer of the machine tool according to claim 2, wherein said tool magazine is disposed in an outer end portion in a radial direction of the turning member and the tool is held by said tool magazine to be directed in a direction crossing the radial direction.

8. The tool changer of the machine tool according to claim 1, wherein said tool magazine is disposed in an outer end portion in a radial direction of the turning member and the tool is held by said tool magazine to be directed to an inner side in the radial direction.

9. The tool changer of the machine tool according to claim 1, wherein said tool magazine is disposed in an outer end portion in a radial direction of the turning member and the tool is held by said tool magazine to be directed in a direction crossing the radial direction.

10. The tool changer of the machine tool according to claim 1, wherein a distance between first ends of each of said partition plates is greater than a distance between portions of said partition plates adjacent to the turn shaft.

11. The tool changer of the machine tool according to claim 10, wherein at least one of said partition plates includes a window plate.

12. The tool changer of the machine tool according to claim 1, further comprising a pair of partition members disposed on a fixed bed, wherein said pair of partition members and said pair of partition plates form a tool housing chamber when said partition members and said partition plates are disposed adjacent to each other.

* * * * *